Aug. 15, 1961     C. G. HARMAN     2,996,696
TEMPERATURE MEASURING DEVICE
Filed March 13, 1959

INVENTOR
CAMERON G. HARMAN
BY *Lawrence I. Field*
ATTORNEY though not essential to the invention, for purposes of illustration only.

United States Patent Office 2,996,696
Patented Aug. 15, 1961

2,996,696
TEMPERATURE MEASURING DEVICE
Cameron G. Harman, Shaker Heights, Ohio, assignor to Horizons Incorporated, Cleveland, Ohio, a corporation of New Jersey
Filed Mar. 13, 1959, Ser. No. 799,277
2 Claims. (Cl. 338—28)

This invention relates to the measurement of elevated temperatures in the range of 3000° F. to 4000° F. or above, and more particularly to the means employed to achieve an accurate temperature measurement even in highly oxidizing environments.

The use of thermocouples at temperatures above about 2000° F. in reactive atmospheres is restricted by the susceptibility of all known metals and metallic alloys to form oxides or to experience a conversion to other chemical compounds such as nitrides or halides, by combination with one or more of the constituents of the atmosphere. In oxygen-containing atmospheres, platinum: platinum-rhodium thermocouples may be used to measure temperatures up to about 3100° F. for relatively short time intervals, but their use for extended periods of time, even at temperatures as low as 2600° F., is not entirely satisfactory because they deviate rapidly from calibrated values owing to chemical changes they experience.

One object of this invention is to provide temperature sensing elements which are stable at temperatures up to about 1000° F. higher than the limiting temperatures for noble-metal thermocouples.

Another object of this invention is to provide an accurate temperature sensing device for measuring temperatures up to about 4000° F. while exposed to reactive environments, and for extended intervals of time.

Still another object of the invention is to provide a method of producing a superior means for sensing temperatures greater than 3500° F.

These and other objects of the invention will become apparent from the following description of a preferred embodiment of the invention.

Figure 1:
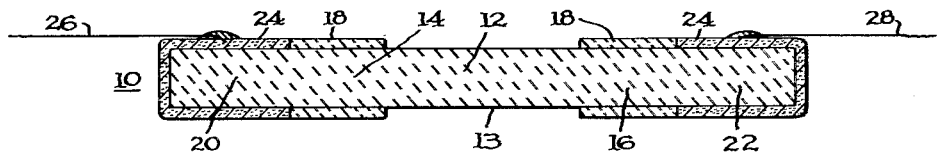
FIGURE 1 is a diagrammatic view showing one form of the improved device.
Figure 2:
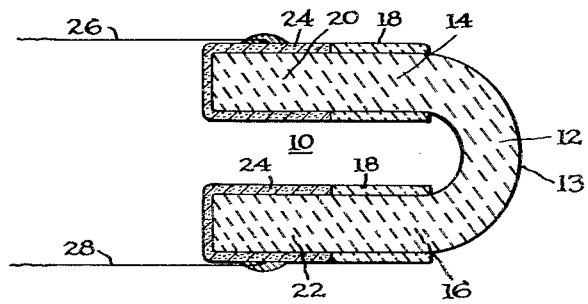
FIGURE 2 is a similar view of a second confiuration of the device of FIGURE 1.

In the drawings the temperature sensing element 10 is shown as comprising a refractory core 12 one portion of which is adapted to remain exposed to the high temperature to be measured. Extending from both ends of a bare centrally disposed region 13 of the core are two generally similar zones 14 and 16, provided with a stabilized protective coating 18 of a suitable refractory material. The two terminal portions 20 and 22 of the temperature measuring device are generally similar to portions 14 and 16 from which they extend, except that they are coated with an electrically conductive coating composition 24 to which lead wires 26 and 28 are secured by welding or other known techniques.

In service the uncoated portion 13 of the device and the protected portions 14 and 16 would be disposed in the hot zone, their total length being such that terminal portions 20 and 22 and the electrical leads therefrom would be disposed outside of the hot zone and hence would not be subjected to the highly corrosive conditions in the hot zone.

Oxides of maximum thermal stability are preferred for the core 12 of the device illustrated. For ease of manufacture a refractory core would be formed in one piece in length sufficient to provide for sections 13, 14, 16, 20 and 22. Thereafter the appropriate coatings would be applied to the intermediate zones 14 and 16 and to the terminal portions 20 and 22.

Oxides which may be used singly or in admixture for the central core 12 include those shown in the following table.

| Oxide | Resistivity (ohm-cm. at indicated temperature) |
|---|---|
| BeO | $10^8$ ohm-cm. (1,500° F.); $10^6$ (4,000° F.). |
| MgO | $10^5$ to $10^6$ (4,000° F.). |
| $Al_2O_3$ | $10^7$ (1,600° F.); $10^6$ (2,500° F.). |

Other oxides or other materials such as refractory nitrides or borides may be used for the core provided that cores formulated therefrom possess an adequate electrical resistance and chemical inertness at the anticipated conditions in service. Cores possessing at least two orders of magnitude of resistance greater than the resistance of the electrical leads and contacts for the system are required. In such instances the errors introduced into the measurement of the elevated temperature by changes in resistance values of the leads and associated circuitry will be within the permissable range.

Core 12 composed of one or more refractory oxides is prepared in the desired configuration by conventional ceramic techniques, and is thereafter sintered under a carefully controlled program to produce a sintered product with a density as close to theoretical density as possible.

Coatings 14 and 16 are then applied to the surface of core 12 in a manner which leaves an uncoated section 13. Painting or spraying of the selected coating material have each been found to be satisfactory.

Coatings 14 and 16 are advantageously formed of stabilized zirconia or other refractory materials selected from materials which possess the following characteristics at the anticipated conditions which the temperature sensing element is expected to encounter in service:

(1) Minimal reaction with core material;
(2) Minimal diffusion into core material;
(3) Stability at service atmospheres; and
(4) Sufficiently low order of resistance.

The choice of coating material is, of course, dependent in some measure on the specific constitution of the core 12. With either magnesia or beryllia or compositions based on same, as the core, it is preferred that stabilized zirconia be applied to the core and fired to form a coating between about 0.01 and 0.001 inch thick.

The coatings on terminal portions 20 and 22 may be formed at the same time as the coatings on sections 14 and 16 and will generally consist of the composition used to coat sections 14 and 16, modified by the incorporation therein of minor amounts of additives to increase the electrical conductivity of the coating. For example, up to about 50% by weight and usually about 33% of platinum or suitable amounts of other oxidation resistant noble metal or noble metal alloy may be admixed with stabilized zirconia in formulating the coating composition for coating of the terminal zones 20 and 22 in order to insure an adequate electrical conductivity of those portions of the coating. The metal containing composition may be fired on the core 12 in the same manner and even at the same time as coatings 14 and 16.

The temperature sensing element is completed by welding electrical leads 26 and 28 to the terminal sections.

Figure 3:
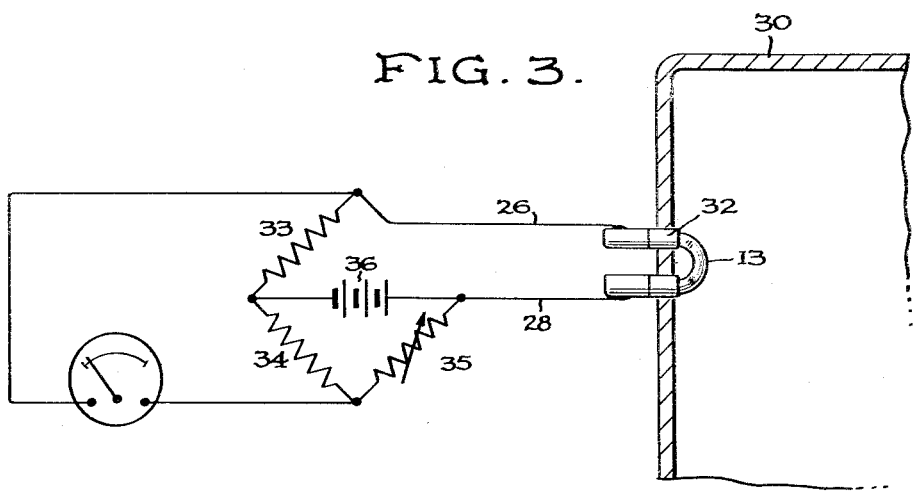
FIGURE 3 is a schematic bridge circuit in which the devices of FIGURES 1 or 2 may be incorporated.

FIGURE 3 shows one manner in which the device is employed in a temperature measuring circuit.

As shown therein, the sensing device 10 is inserted in a furnace 30, through an electrically insulated fitting 32 in the roof of the furnace, to such an extent that the bare portion 13 of the core is exposed to the hot corrosive furnace atmosphere. Leads 26 and 28 are connected so that the device constitutes one arm of a Wheatstone bridge, the other arms being two fixed resistors 33 and 34 and a potentiometer 35 respectively. A uniform potential is applied across the sensing element by a battery 36.

As the temperature changes, the resistance of the sensing device, and particularly the electrical resistance of the core 12 of the device changes. Potentiometer 35 may be calibrated to indicate this change in resistance or the change in some other resistance dependent variable such as voltage, or it may be calibrated directly in units of temperature.

While I have described a preferred embodiment of my invention, in which portions of a core based on magnesia or beryllia is provided with a coating of zirconia, it will be understood that many modifications of my invention may be made without departing from the intended scope thereof as defined in the appended claims.

I claim:

1. A temperature measuring device adapted to measure temperatures above about 2000° F. and consisting of a ceramic core consisting of at least one refractory oxide selected from the group consisting of BeO and MgO said core having a bare uncoated central portion located intermediate of the ends of said core and adapted to be exposed directly to the environment whose temperature is to be measured; a thin adherent coating of stabilized zirconia completely encasing a portion of said core on either side of said bare central portion; an electrically conductive refractory coating consisting essentially of stabilized zirconia and at least one noble metal in an amount sufficient to render said stabilized zirconia electrically conductive, said electrically conductive coating being adherently disposed on said core and extending from the ends of said core to the stabilized zirconia protectively coated portions; and electrical leads secured to said electrically conductive portion.

2. The device of claim 1 wherein the stabilized zirconia coating extends to the extremities of said core and the electrically conductive coating is disposed on portions of said stabilized zirconia coating adjacent to the ends of said core.

References Cited in the file of this patent

UNITED STATES PATENTS

| | | |
|---|---|---|
| 1,106,960 | Nernst | Aug. 11, 1914 |
| 2,106,249 | Hower | Jan. 25, 1938 |
| 2,271,975 | Hall | Feb. 3, 1942 |
| 2,700,720 | Torok | Jan. 25, 1955 |
| 2,937,354 | Mazzarella et al. | May 17, 1960 |

FOREIGN PATENTS

| | | |
|---|---|---|
| 645,007 | Germany | May 20, 1937 |

OTHER REFERENCES

Trans. Electrical Engineering, November 1946, volume 65, Article by Becker et al., pages 711–725.